United States Patent [19]

Hofmann

[11] 4,323,800
[45] Apr. 6, 1982

[54] CONTROL OF COOLING OF SUPERCONDUCTING ROTOR

[75] Inventor: Albert Hofmann, Karlsruhe, Fed. Rep. of Germany

[73] Assignee: Kernforschungszentrum Karlsruhe Gesellschaft mit beschränkter Haftung, Karlsruhe, Fed. Rep. of Germany

[21] Appl. No.: 146,402

[22] Filed: May 5, 1980

[30] Foreign Application Priority Data

May 5, 1979 [DE] Fed. Rep. of Germany ....... 2918148

[51] Int. Cl.³ .............................................. H02K 9/00
[52] U.S. Cl. .................................................. 310/52
[58] Field of Search .................. 310/52, 54, 61, 60, 310/59, 64, 65; 62/505

[56] References Cited

U.S. PATENT DOCUMENTS

| 4,048,529 | 9/1977 | Pomeroy et al. | 310/54 |
| 4,056,745 | 11/1977 | Eckels | 310/52 |
| 4,082,967 | 4/1978 | Laskaris | 310/64 |
| 4,091,298 | 5/1978 | Gamble | 310/52 |
| 4,123,677 | 10/1978 | Laskaris et al. | 310/52 |
| 4,164,671 | 8/1979 | Gamble | 310/52 |
| 4,194,137 | 3/1980 | Vinokurov et al. | 310/52 |
| 4,204,134 | 5/1980 | Fritz et al. | 310/52 |
| 4,223,239 | 9/1980 | Eckels | 310/52 |
| 4,227,102 | 10/1980 | Rozenfeld et al. | 310/52 |
| 4,280,071 | 7/1981 | Eckels | 310/52 |

OTHER PUBLICATIONS

"Thermodynamics of a Self-Pumping Cooling Cycle for Superconducting Generator Applications", Hofmann et al., *Cryogenics*, 7/77, pp. 429-434.

"Improved Thermal Design of the Cryogenic Cooling System for a Synchronous Generator", Bejan, 12/74.

*Primary Examiner*—Donovan F. Duggan
*Attorney, Agent, or Firm*—Spencer & Kaye

[57] ABSTRACT

To effect a self-regulating replenishment of helium from a reservoir into a helium pool in the superconducting rotor of a generator, in which helium in the pool boils at subatmospheric pressure, and a portion of the helium being transferred from the reservoir changes to the vapor phase, and in which both helium phases are delivered into the helium pool at a distance from the axis of rotor rotation, the two helium phases are separated from one another, and the liquid and vapor phases are introduced separately into the pool at respectively different distances from the axis of rotor rotation, the liquid phase being introduced at a greater distance than the vapor phase from the axis, and the vapor phase being introduced into the pool at a distance from the axis of rotor rotation which is greater than that of the vapor/liquid interface in the pool.

4 Claims, 2 Drawing Figures

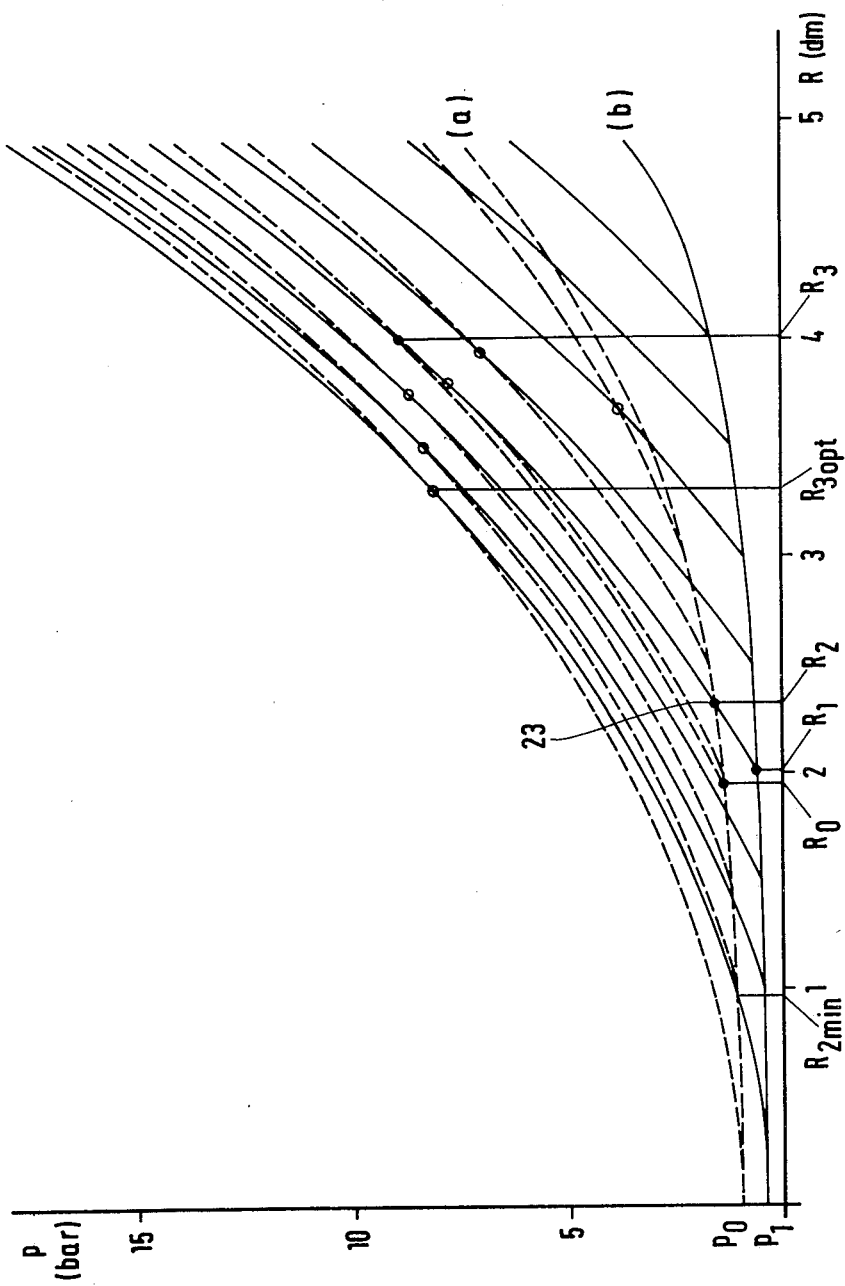

CONTROL OF COOLING OF SUPERCONDUCTING ROTOR

BACKGROUND OF THE INVENTION

The invention relates to a method and to an apparatus for a self-regulating replenishment, from a reservoir, of a helium pool which evaporates, or boils, at subatmospheric pressure to cool the superconductive rotor of an electrical machine, such as a generator, part of the helium changing to the vapor phase during the transfer and both phases being fed into the helium bath at a distance from the axis of rotation.

In order to attain high reliability during the operation of electrical machines employing rotating superconducting field windings, it is necessary to feed the liquid helium in such a manner that operation of the machine will not be interfered with even if there is a malfunction in the cooling system. This "decoupling" of the electrical machine from the cooling system is assured in a simple manner by connecting a reservoir for liquid helium between the machine and the cooling system. The pressure in this reservoir is advisably at the atmospheric level or, in order to prevent the entrance of impurities into the liquid helium from the free atmosphere, at a slightly higher level.

To attain high current densities, the superconducting rotor winding is cooled, for example, with helium which boils, or evaporates, at a reduced pressure of a few tenths of a bar and thus has a boiling temperature of $T < 4.2°$ K. This subatmospheric pressure in the rotor can be maintained in a simple manner by appropriately guiding the stream of exhaust gas. Since the exhaust gas leaves the rotor at ambient pressure after it has absorbed heat generated therein, additional pumps are not required in the cold portion of the rotor to produce the subatmospheric pressure.

Essentially three methods are known to solve such a problem. For example, Bejan in "Improved Thermal Design of the Cryogenic Cooling System for a Superconducting Synchronous Generator", Thesis, MIT (1974) and Eckels, in U.S. Pat. No. 4,056,745 propose to expand by means of a choke valve the incoming helium to the subatmospheric pressure existing in the rotor (Joule-Thomson expansion). The valve must be actively controlled corresponding to the flow of helium required in the rotor.

Other proposals, such as in U.S. Pat. Nos. 4,082,967 and 4,048,529 and "Superconducting Generator Design" EPRI-EL-577 (November, 1977), are based on the fact that the helium flowing into the rotor contains a relatively large proportion of vapor due to the thermal losses in the transfer conduit. Therefore, the rotating feeder line is designed so that liquid and vapor are spatially separated, at least in the radial portion of the feeder line. The pressure curve in this conduit is given by the vapor compression due to rotation. This conduit opens into the liquid boiling, or evaporating, at subatmospheric pressure at a point where the hydraulic pressure of the liquid is equal to that in the vapor column. This replenishing system is self-regulating as long as the vapor component does not become too low.

Another method is described in the text "Cryogenics" 17, 429 (1977). In this process, pure liquid is introduced through a radial feeder line and is fed into the helium boiling at subatmospheric pressure at the point where the hydraulic pressures are identical. The radius at which the introduction occurs is greater then when a vapor-liquid mixture is fed in. For example, in a 50-Hz rotor, the radius must be greater than 0.33 m. A further drawback is that only pure liquid is conducted through the radial feeder line.

SUMMARY OF THE INVENTION

It is an object of the present invention to achieve a self-regulating replenishment into the rotor of such a system independently of the vapor component of the helium to be fed in and also independently of the size of the rotor to be supplied.

This and other objects are achieved, according to the invention, in a method for effecting a self-regulating replenishment of helium from a reservoir into a helium pool in the superconducting rotor of a generator, in which helium in the pool boils at subatmospheric pressure, and a portion of the helium being transferred from the reservoir changes to the vapor phase, which method includes delivering both phases into the helium pool at a distance from the axis of rotor rotation by effecting such delivery by separating the two phases of the helium from one another; and introducing the liquid and vapor phases separately into the pool at respectively different distances from the axis of rotor rotation, the liquid phase being introduced at a greater distance than the vapor phase from the axis, and the vapor phase being introduced into the pool at a distance from the axis of rotor rotation which is greater than that of the vapor/liquid interface in the pool.

Significant features of the invention are that the liquid and the vapor of the inflowing helium are separate in a phase separator which is integrated in the rotor and are each fed into the rotor at suitable points, that the location of the introduction can be freely selected within wide limits and that the system is self-regulating and operates independently of the magnitude of the vapor content in the helium.

The particular advantages of the invention are its high operational reliability due to elimination of active regulating elements, its adaptability to various types of rotor designs and the distinct separation of liquid and vapor which makes it possible to reliably calculate the individual distances required for feeding in the individual phases.

BRIEF DESCRIPTION OF THE DRAWING

FIG. 2 is a diagram illustrating the operation of the invention.

DESCRIPTION OF THE PREFERRED EMBODIMENTS

Figure 1:
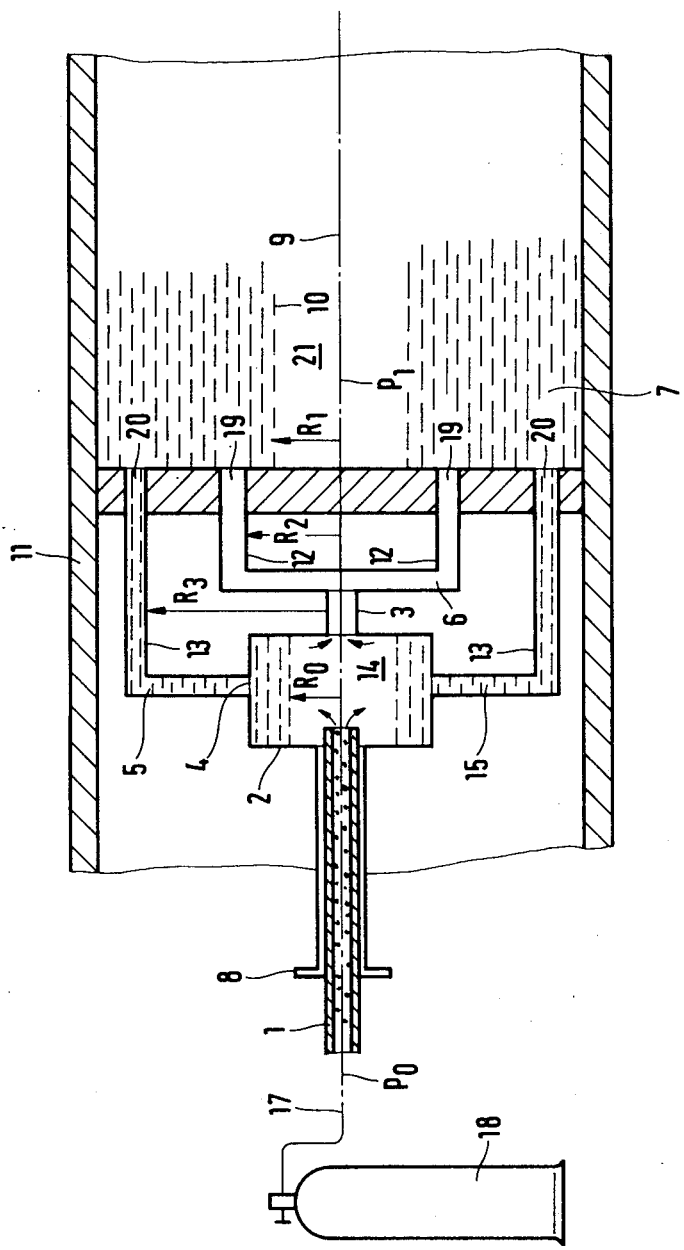
FIG. 1 is a simplified cross-sectional view of a preferred embodiment of apparatus for carrying out the invention.

One preferred embodiment of apparatus according to the invention is illustrated in simplified form in FIG. 1. In this apparatus, liquid helium 17 flows through a stationary conduit 1 which is insulated by a vacuum jacket, from a helium reservoir tank 18 which is under a supply pressure of $P_0 (\approx 1$ bar) and opens into a phase separator 2 which is mounted in, and rotating with, a superconductive rotor 11 of a dynamoelectric machine such as a generator.

The phase separator 2 is composed essentially of a branching piece, or manifold, adaptable to various given designs, for two different conduit systems 12 and 13, and presents a discharge line 3 for the vapor phase 14, for example coaxial with the axis 9 of rotor rotation, and at least one outlet 4 along the periphery for conducting and liquid phase 15 to conduit system 13.

Due to rotor rotation and the difference in density between the two coolant phases, the vapor phase 14 developing in the supply conduit 1 is separated from the liquid phase 15 so that the liquid, or liquid phase, 15 is urged to the periphery of the phase separator 2. With a sufficiently high rate of rotation, the separation will take place even when the rotor axis 9 is disposed horizontally. For example, at a distance of 1 cm from the axis, the centrifugal acceleration due to the operating speed of a 50 Hz synchronous generator is already 100 times greater than the acceleration due to gravity.

Liquid phase 15 and vapor phase 14 are conducted separately through respective phase conduits, conduits 5 and 13 being associated with the liquid phase and conduits 6 and 12 with the vapor phase, into a helium pool 7 within the rotor. Helium in the pool evaporates, or boils, in the vicinity of the axis of rotation 9 at a pressure $p_1$ which is less than $p_0$. The conduit systems for the liquid phase 15 and the vapor phase 14 may be formed of individual pipes 6 and 12, 5 and 13, respectively, which are arranged at an angle to one another, of a single pipe, or of a plurality of pipes brought obliquely or in the form of disc or ring-shaped channels to the feeding points 19 and 20.

The vapor phase 14 is fed into the helium pool 7 at a radius $R_2$ of the rotor and the liquid phase 15 at a radius $R_3$. The radius $R_0$ which develops for the vapor phase 14, i.e. for the vapor/liquid phase interface, in the phase separator 2, and the radius $R_1$ for that interface in the pool 7 to be replenished adjust themselves in such a manner that the hydraulic pressures at the outlet feeding points 19 and 20 of conduits 12 and 13 are the same as those at the same radial distances in the helium pool 7.

FIG. 2 shows how the pressures p, in bars, in conduits 12 and 13 change in dependence on the radii $R_0$ and $R_1$, in meters, of the phase interfaces in separator 2 and pool 7. The example illustrates typical conditions in a large superconducting turbine rotor with a rotation rate of 50 Hz and a diameter of 1 m. Along the axis of the rotor 11, a pressure $p_1$ of 0.41 bar is assumed to exist, as it may develop, for example, as a result of the self-pumping effect in the exhaust gas circuit (not shown in detail).

The broken-line curve (a) illustrates the pressure in rotating saturated vapor with an axial pressure of $p_0 = 1$ bar, i.e. in chamber 2, and the solid-line curve (b) is the corresponding curve for an axial pressure $p_1 = 0.41$ bar, i.e. in pool 7. The other curves which branch off from curves (a) and (b) illustrate the pressures in the liquid phase beyond the vapor/liquid phase interfaces for different values of the radii $R_0$ and $R_1$. Each of the other curves branches off of its associated base curve (a) or (b) at the point corresponding to the associated interface radius value. These groups of curves show the limits within which the radii $R_0$, $R_1$, $R_2$ and $R_3$ can be varied.

As an example, the following is assumed to exist in FIG. 2: helium in the liquid phase 15 is fed in the pool 7 at $R_3 = 0.4$ m and the vapor phase 14 is fed in at $R_2 = 0.23$ m. As previously stated, the pressures at outlets 19 and 20 are to equal the pressures at corresponding radii in pool 7. In addition, at radius $R_2$, the saturated vapor pressure based on an axial pressure $p_0$ should equal the liquid phase pressure in pool 7, based on an axial pressure $p_1$. This equality exists at point 23 in FIG. 2. Utilizing, therefore, the solid-line branch curve which passes through point 23 and the broken-line branch curve which intersects the first-mentioned branch curve at abscissa value $R_3$, it can be determined that phase interfaces will then develop at $R_0 = 0.195$ m at $R_1 = 0.200$ m.

The lower the temperature at the periphery of the rotor 11, the smaller is the central vapor area 21. This means, in view of the above, that it should be desired to have a vapor area 21 which is as small as possible at $R_1$. For $R_1 = R_2 = 0$, the pressure patterns for which are represented by the first, or upper, broken-line and solid branch curves, the optimum liquid feed-in radius will be at $R_{3opt} = 0.33$ m and the associated vapor feed-in radius $R_{2min} = 0.098$ m.

The calculation below shows that this type of replenishing device has a self-regulating effect. When the helium level drops in the pool 7 to be replenished, corresponding to an increase of $R_1$, the pressure drops at the outlet end of the liquid feed-in circuit 13 as well as at the vapor feed-in conduit 12. Thus replenishment of liquid phase 15 from the stationary conduit 1 is automatically increased. The pressure $p_0$ can be selected so high that no impurities from the ambient atmosphere are sucked in through the rotary passage 8.

In the calculation which leads to the result illustrated in FIG. 2 it must be considered that the thermodynamic state of the helium changes considerably during compression due to centrifugal acceleration. Thus no heat is supplied to or removed from the helium in the feeder lines 12 and 13. This means that it is preferable for these conduits to be manufactured of material having a poor heat conductivity (e.g. stainless steel). The increase in pressure in the individual phases is calculated from the change in state $$h(R) - h(o) = \tfrac{1}{2}\omega^2 R^2 \tag{1}$$

and $$s = \text{const}, \tag{2}$$

where $h(o)$ and $h(R)$ are the specific enthalpies at the centerline and at the radius R resp., s is the specific entropy, and $\omega/2\pi$ is the rotational speed. The vapor is compressed adjacent the phase interface in the phase diagram so that the following applies $$\int_{p(r_1)} \frac{dp}{\rho_s} = \tfrac{1}{2}\omega^2(r_1^2 - r_o^2),$$

where $\rho_s$ is the density of the saturated vapor.

The equations (1), (2) and (3) can also be verified experimentally.

It is to be understood that the above description of the present invention is susceptible to various modifications, changes and adaptations, and the same are intended to be comprehended within the meaning and range of equivalents of the appended claims.

What is claimed is:

1. In a method for effecting a self-regulating replenishment of helium from a reservoir into a helium pool in the superconducting rotor of a generator, in which helium in the pool boils at subatmospheric pressure, and a portion of the helium being transferred from the reservoir changes to the vapor phase, which method includes delivering both phases into the helium pool at a distance from the axis of rotor rotation, the improvement wherein said step of delivering comprises: separating the two phases of the helium from one another; and introducing the liquid and vapor phases separately into the pool at respectively different distances from the axis of rotor rotation, the liquid phase being introduced at a greater distance than the vapor phase from the axis, and the vapor phase being introduced into the pool at a distance from the axis of rotor rotation which is greater than that of the vapor/liquid interface in the pool.

2. Method as defined in claim 1 wherein said step of separating is performed in a phase separator rotating with the rotor and receiving helium from the reservoir, such that the vapor phase leaves the separator in the region of its axis of rotation, and said step of introducing is carried out by feeding the vapor phase leaving the separator through a vapor phase conduit system to the pool at a point where the hydraulic pressure in the helium pool is identical to that of the vapor phase.

3. Method as defined in claim 1 wherein said step of separating is performed in a phase separator rotating with the rotor and receiving helium from the reservoir, such that the liquid phase leaves the separator in the region of its periphery, and said step of introducing is carried out by feeding the liquid phase leaving the separator through a liquid phase conduit system to the pool at a point where the hydraulic pressure in the helium pool is identical to that of the liquid phase.

4. A device for effecting a self-regulating replenishment of helium from a reservoir into a helium pool in the superconducting rotor of a generator, in which helium in the pool boils at subatmospheric pressure, said device comprising: a phase separator mounted to rotate with the rotor for separating the helium liquid and vapor phases from one another; helium intake means extending along the axis of rotation of, and rotating with, said separator for delivering liquid helium thereto; a peripheral liquid phase conduit system connected between said separator and said rotor for conducting liquid-phase helium from the region of the periphery of said separator to the pool at a location spaced from the axis of rotation of said rotor; and a vapor phase conduit system connected between said separator and said rotor for conducting vapor-phase helium from the region of the axis of rotation of said separator to the pool at a location which is spaced from the axis of rotation of said rotor by a distance less than that at which the liquid phase is supplied to the pool and greater than that of the vapor/liquid interface in the pool.

* * * * *